(12) United States Patent
Taylor et al.

(10) Patent No.: US 6,497,091 B1
(45) Date of Patent: Dec. 24, 2002

(54) HYPERGOLIC IGNITOR ASSEMBLY

(75) Inventors: Eric S. Taylor, Huntsville, AL (US);
W. Neill Myers, Huntsville, AL (US);
Michael A. Martin, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 9 days.

(21) Appl. No.: 09/877,800

(22) Filed: Jun. 6, 2001

(65) Prior Publication Data

US 2002/0184872 A1 Dec. 12, 2002

(51) Int. Cl.⁷ ................................................. F02C 7/24
(52) U.S. Cl. .................................................. 60/39.824
(58) Field of Search ............................ 60/39.824, 257, 60/256

(56) References Cited

U.S. PATENT DOCUMENTS 3,116,599 A * 1/1964 Cambell ...................... 60/251

* cited by examiner

Primary Examiner—Ehud Gartenberg

(74) Attorney, Agent, or Firm—James J. McGroary

(57) ABSTRACT

An ignitor for use with the MC-1 rocket engine has a cartridge bounded by two end caps with rupture disc assemblies connected thereto. A piston assembly within the cartridge moves from one end of the cartridge during the ignition process. The inlet of the ignitor communicates with a supply taken from the discharge of the fuel pump. When the pump is initially started, the pressure differential bursts the first rupture disc to begin the movement of the piston assembly toward the discharge end. The pressurization of the cartridge causes the second rupture to rupture and hypergolic fluid contained within the cartridge is discharged out the outlet. Once the piston assembly reaches the discharge end of the cartridge, purge grooves allow for fuel and remaining hypergolic fluid, to be discharged out the ignitor outlet into the combustion chamber to purge the ignitor of any remaining hypergolic fluid.

17 Claims, 2 Drawing Sheets

HYPERGOLIC IGNITOR ASSEMBLY

ORIGIN OF THE INVENTION

This invention was made by employees of the United States Government and may be manufactured and used by or for the Government for governmental purposes without the payment of any royalties thereon or thereof.

BACKGROUND OF THE INVENTION

1. Field of the Invention

This invention relates to an ignitor for a rocket engine, and more specifically, to a hypergolic liquid ignitor for use with a rocket engine, such as the MC-1 engine.

2. Prior Art

Various hypergolic ignitor designs have been developed in the past. These ignitors are utilized to commence the burning of the rocket engine propellants in the combustion chamber. Hypergolic fluid is designed to ignite spontaneously upon contact with an oxidizer. The prior art ignitors are mounted off the main injector of the rocket engine and are typically incorporated into a fuel bypass line feeding the injector. These ignitors dispense the hypergolic fluid through the injector into the combustion chamber where the fuel was ignited. Fuel pressure from the feed or fuel system forces the ignitor fluid into the combustion chamber where it ignites the rocket engine propellants.

The traditional hypergolic ignitor designs suffer from a plurality of disadvantages. First, they are typically non-reusable and expensive to construct since they are not constructed with off-the-shelf components. Secondly, the filling of the prior art ignitors requires a high degree of complexity. Furthermore, the prior art ignitors deliver the ignitor fluid through the combustion chamber injector instead of directly into the combustion chamber. This introduces a plurality of additional design considerations for both the ignitor and the injector.

Thus, a need exists for an efficient, cost effective ignitor which may communicate directly with the combustion chamber rather than requiring the complexity of additional valves or flow control devices to deliver ignitor fluid through the injector.

Another need exists for a modular design for an ignitor allowing faster assembly and interchangeability of parts.

A further need exists for a method of joining two structural members while providing for disassembly at a later date.

SUMMARY OF THE INVENTION

Consequently, it is a primary object of the present invention to provide a cost effective ignitor for use with rocket engines, including the MC-1 engine.

It is another object of the present invention to provide an ignitor with purge grooves providing side chamber injection of hypergolic fluid to reduce the complexity of the combustion chamber injector.

Accordingly, the present invention provides an ignitor having a cartridge contained within end caps. Each of the end caps contains rupture disc assemblies. A piston is located within the cartridge and is moveable from one end of the cartridge to the other, a discharge end. The ignitor is designed to provide a low pressure, hypergolic liquid to produce a sustainable ignition source for a rocket engine chamber.

The cartridge is filled with a mixture of hypergolic fluid, Triethylaluminum and Triethylborane (TEA/TEB). A first rupture disc is ruptured to provide the motive force to drive the piston. As the piston moves toward the discharge end, the second rupture disc ruptures to deliver the hypergolic fluid into the combustion chamber. At the discharge end of the cartridge are two purge grooves which allow for fuel purging at a reduced flow rate after the TEA/TEB has been expelled to remove residual hypergolic fluid from the cartridge.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
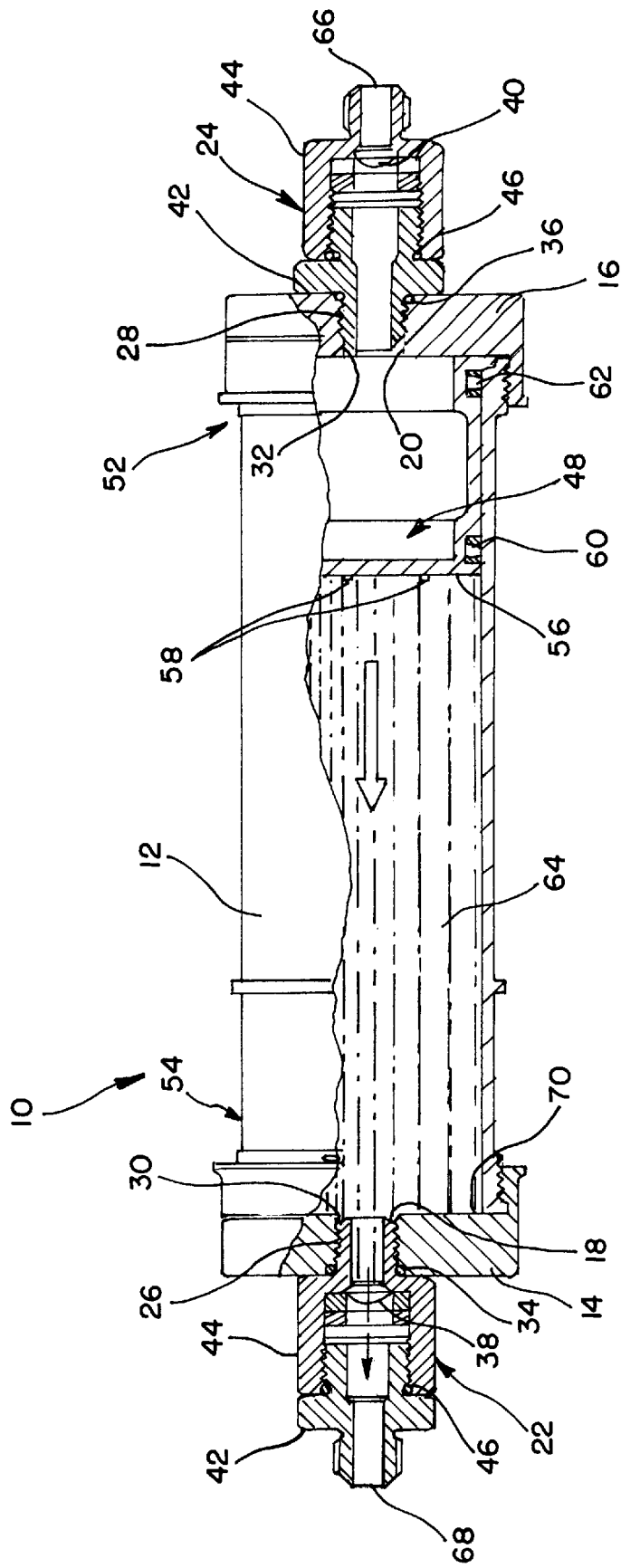
FIG. 1 is a partial cutaway elevational view of an ignitor for use with a rocket engine in accordance with the present invention.
Figure 2:
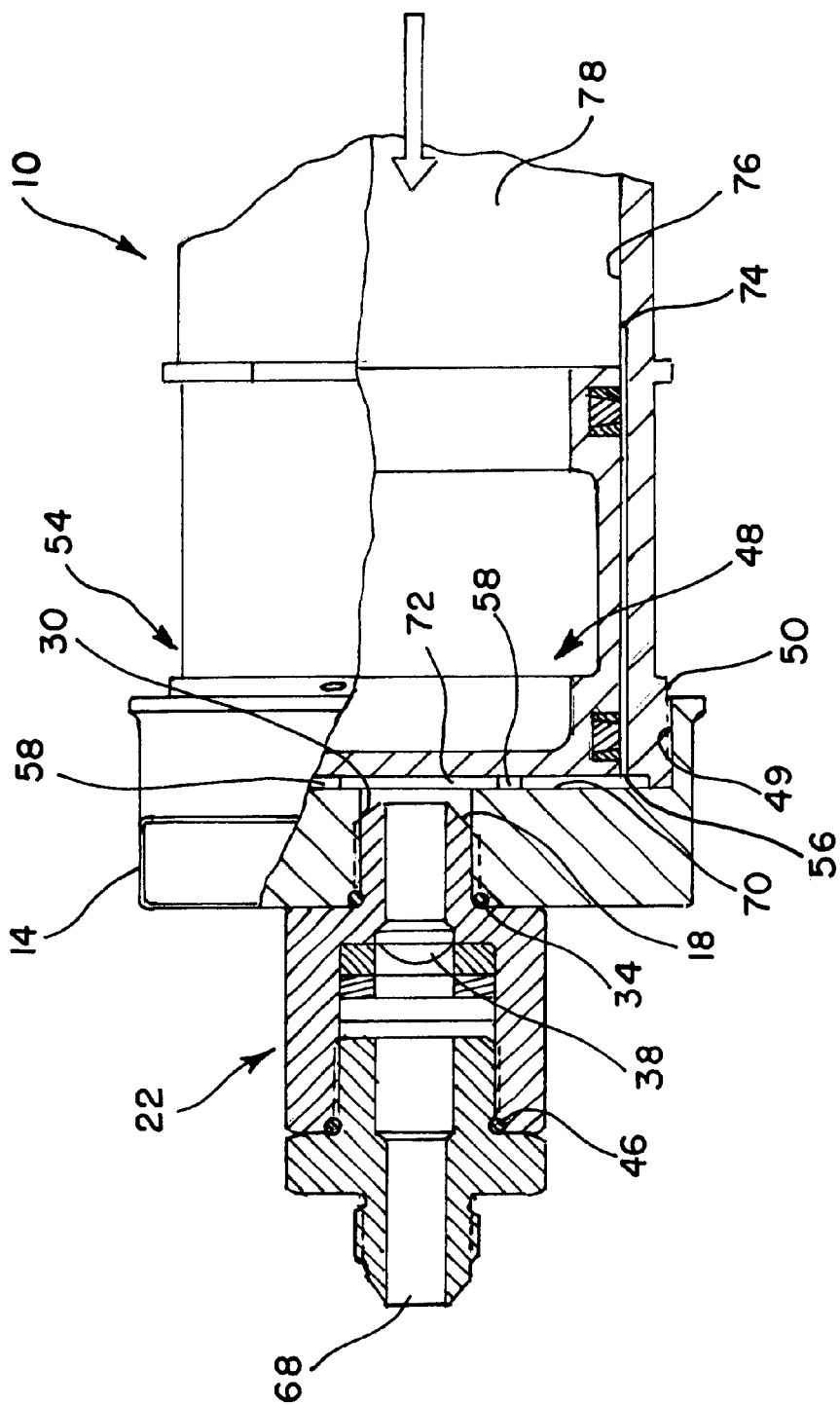
FIG. 2 is a partial cutaway elevational view of the discharge end of the ignitor of FIG. 1.

Referring to FIGS. 1 and 2, an ignitor 10 for use with a rocket engine is illustrated. The ignitor 10 of the preferred embodiment is adapted to work with an MC-1 rocket engine currently produced by SUMMA Technology, Inc. of Huntsville, Ala. for NASA.

Structurally, the ignitor 10 is comprised of a cartridge 12 with end caps 14, 16 on either. end of the cartridge 12. The cartridge 12 is preferably substantially cylindrical with a cavity therein which initially contains hypergolic fluid which is utilized to ignite the propellant, i.e., rocket fuel in the combustion chamber (not shown). The end caps 14, 16 each contain openings 18, 20 where rupture disc assemblies 22, 24 connect to the end caps 14,16.

The rupture disc assemblies 22,24 preferably include threads 26,28 which cooperate with threads 30,32 in the openings 18,20 of the end caps 14,16 to secure the rupture disc assemblies 22,24 to the end caps 14,16. The openings 18, 20 represent an outlet and an inlet, respectively of the cartridge 12. Fluorocarbon O-rings 34,36 are utilized to ensure that no air leaks into the ignitor 10 past the connection of the rupture disc assemblies 22,24 to the end caps 14,16.

The rupture disc assemblies 22,24 contain rupture discs 38,40 which are typically metal domes scored in a pattern such that the discs 38,40 break, or rupture, at a specific pressure differential across the discs 38,40. The rupture disc assemblies 22,24 are preferably created from a male and a female housings 42,44 which allow for quick assembly from inexpensive parts. Furthermore, the discs 38,40 themselves are off the shelf items which provide reliable, precise and repeatable performance since they can be easily replaced in this design. A fluorocarbon O-ring 46 may be utilized to provide a seal between the housings 42,44 when the housings 42, 44 are screwed together as illustrated.

The end caps 14,16 preferably connect to the cartridge 12 with interconnecting threads. Threads 49 are located on the end caps and threads 50 are located on the cylinder. These threads 49,50 cooperate to secure the end caps 14,16 to the cartridge 12. A polytetraflouroethylene (PTFE) O-ring is preferably utilized to form an air-tight seal between the end caps 14,16 and the cartridge 12 after screwing the components together.

Inside the cartridge 12 is a piston assembly 48. The piston assembly 48 is shown in a first position in FIG. 1 at the first end 52 of the cartridge 12. The piston assembly 48 includes a piston face 56 preferably including a plurality of nubs 58. The piston assembly is slightly smaller than the interior of the cylinder so that the piston assembly can move from the first end 52 to the second, or discharge, end 54 of the cartridge. Seals 60,62 are preferably elastomeric to form a pressure barrier while allowing the piston assembly 48 to move through a portion of the length of the cartridge 12. The interior volume, or cavity, of the cartridge 12 is initially filled with a hypergolic fluid 64, such as Triethylaluminum and Triethylborane (TEA/TEB). The cavity 78 is shown: in FIG. 2 after the hypergolic fluid 64 has been injected into the combustion chamber (not shown).

The ignitor-has an inlet 66 which receives discharge from the fuel pump (not shown). During the start sequence, helium is initially supplied to a turbine which begins to spin the fuel pump and provides pressure at the fuel pump discharge. A supply line (not shown) connects the ignitor inlet 66 to the discharge of the fuel pump. An ignition valve (not shown) opens in the supply line allowing the pressure at the inlet to be the discharge pressure of the fuel pump. The inside of the cartridge 12 is at about ambient pressure. This difference in pressure results in he first rupture disc 40 bursting to provide about 200 psig of pressure differential across the piston face 56.

The piston assembly 48 then moves toward the second end 54 of the cartridge 12 which pressurizes the interior of the cartridge 12 creating a pressure differential across the second rupture disc 38 causing it to burst. The hypergolic fluid 64 is then directed out the outlet 68 into the combustion chamber. Liquid oxygen, or other appropriate oxidizer, is provided into the combustion chamber through the injector. When the oxidizer and hypergolic fluid 64 mix, a spontaneous combustion occurs. This will light the propellant, or rocket fuel also provided to the chamber through the injector.

The piston assembly 48 continues to move toward the second end 54 until it stops at the end cap 14. In the preferred embodiment, nubs 58 come to rest against the interior surface 70 of the end cap 14 as shown in detail in FIG. 2. The nubs 58 have been found effective in ensuring that a channel 72 remains in front of the piston face 56 when the nubs 58 contact the interior surface 70 of the end cap 14. This prevents the piston face 56 from sealing against the end cap 14. Of course, channels could also be formed in the piston face 56.

In the preferred embodiment, the TEA/TEB mixture is delivered at a rate of about 1.0 lbm/sec to the combustion chamber to mix with liquid oxygen propellant supplied from the combustion chamber injector. This hypergolic mixture produces about 18,000 BTU/sec at about 3,000 degrees Fahrenheit for approximately 0.9 seconds, long enough to ignite the propellant provided from the fuel pump. Obviously, the ignitor volume, piston area and operating pressures can be tailored for desired ignition time or energy requirements.

Purge grooves 74 are preferably located in the interior surface 76 of the cartridge 12 proximate to the second end 54 of the cartridge 12. In the preferred embodiment, two grooves 74 at one hundred eighty degrees apart have been found adequate, only one of which is illustrated in FIG. 2. The purge grooves 74 provide a flow path for fuel to be directed past the sides of the piston assembly 48 and through the channel 72 and out the outlet 68 when the piston assembly 48 has traversed the length of the cartridge 12 to a discharged position as shown in FIG. 2

After the start sequence, the rocket fuel, or propellant, is pumped into the combustion chamber by the fuel pump. A portion of the discharge of the fuel pump continues to be supplied through the inlet 66 into the ignitor 10. This fuel is used to "purge" the remaining hypergolic fluid from the ignitor 10 which remained after the piston assembly 48 moved over the purge grooves 74 located on the interior surface 76 of the cartridge 12 and out the channel 72 formed due to the piston face 56 not sealing against the end cap 14 to the outlet 68. The purge grooves 74 illustrated have been machined into the interior surface 76 of the cartridge 12. The fuel, and remaining hypergolic fluid, if any, continue out the ignitor outlet 68 to be consumed in the combustion chamber. It is desirable to remove any hypergolic fluid from the ignitor 10 so that when the engine is recovered, the ignitor 10 can be disassembled in relative safety. If any hypergolic fluid remains in the cartridge 12, opening of the end caps 14,16 would expose the remaining fluid to oxygen thereby instigating spontaneous combustion of the remaining fluid.

Due to the modular, and relatively simple construction, the ignitor 10 can be reused after relatively simple refurbishment and cleaning.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the AS spirit 6 of the invention are intended to be included within the scope of the appended claims.

Having thus set forth the nature of the invention, what is claimed herein is:

1. An ignitor for use with a rocket engine to provide hypergolic fluid directly to a combustion chamber, said ignitor comprising:
   a cartridge having a cavity with a length therein and an inlet and an outlet;
   a piston assembly moveable between a first position and a discharged position along the length of the cartridge within the cavity; and
   a supply of hypergolic fluid located within the cavity between the piston assembly and the outlet, wherein movement of the piston assembly from the first position to the discharged position expels at least some of the supply of hypergolic fluid out of the outlet;
   at least one purge groove located along an interior surface of the cartridge cavity, wherein when said piston assembly is in the discharged position, said purge groove provides a conduit for flow around the piston assembly from the ignitor inlet to the ignitor outlet.

2. The ignitor of claim 1 further comprising first and second end caps located at opposing ends of the length of the cartridge, said end caps having threads, said cartridge further comprising threads which cooperate with the threads of the end caps to allow the end caps to be screwed to the cartridge.

3. The ignitor of claim 2 further comprising O-rings forming a seal between the end caps and the cartridge.

4. The ignitor of claim 2 further comprising an inlet and an outlet, and rupture disc assemblies connected to the end caps, said rupture disc assemblies communicating the inlet and the outlet of the cartridge to the inlet and outlet of the ignitor.

5. The ignitor of claim 4 wherein the rupture disc assemblies further comprise threads which cooperate with threads in the end caps to allow the rupture disc assemblies to screw into the end caps to connect the rupture disc assemblies to the end caps.

6. The ignitor of claim 5 further comprising an O-ring between the first end cap and the connecting rupture disc assembly.

7. An ignitor for use with a rocket engine comprising:

a cartridge having a length and a cavity therein;

first and second end caps located at opposing ends of the cartridge separated by the length, the first end cap having an inlet, and the second end cap having an outlet; and a piston assembly moveable between a first position and a discharged position along the length of the cartridge within the cavity, wherein the piston assembly is closer to the outlet in the discharged position than in the first position;

at least one purge groove located along an interior surface of the cartridge cavity, wherein when said piston assembly is in the discharged position, said purge groove provides a conduit for flow around the piston assembly from the ignitor inlet to the ignitor outlet.

8. The ignitor of claim 7 further comprising a first rupture disc assembly connected to the first end cap at the inlet, and a second rupture disc assembly connected to the second end cap at the outlet.

9. The ignitor of claim 8 wherein the first rupture disc assembly contains a rupture disc therein.

10. The ignitor of claim 9 wherein the rupture disc is designed to rupture upon the application of a pressure differential of greater than about one hundred fifty psid as applied from across the rupture disc from a rupture disc assembly inlet towards the inlet of the first end cap.

11. The ignitor of claim 8 wherein the first rupture disc assembly further comprises threads and the first end cap further comprises threads and the first rupture disc and the first end cap are screwed together.

12. The ignitor of claim 11 further comprising an O-ring between the first rupture disc assembly and the first end cap.

13. The ignitor of claim 12 wherein the piston assembly further comprises a piston face having nubs extending therefrom and wherein when said piston assembly is in the discharged position, said nubs contact an interior surface of the second end cap thereby defining a channel between the second end cap and the piston face to communicate flow from the at least one purge groove to the ignitor outlet.

14. The ignitor of claim 13 wherein the cartridge further comprises two opposing purge grooves located substantially one hundred eighty degrees apart on the interior of the cartridge.

15. The ignitor of claim 7 further comprising a supply of hypergolic fluid located within the cavity between the piston assembly and the outlet, wherein movement of the piston assembly from the first position to the discharged position expels at least some of the supply of hypergolic fluid out of the outlet.

16. An ignitor for use with a rocket engine comprising:

a cartridge having a cavity therein, a length, an inlet and an outlet;

a piston assembly moveable between a first position and a discharge position along the length of the cartridge within the cavity; and first and second rupture disc assemblies having rupture discs contained therein, said first rupture disc assembly connected to the inlet, and said second rupture disc assembly connected to the outlet;

at least one purge groove located along an interior surface of the cartridge cavity, wherein when said piston assembly is in the discharged position, said purge groove provides a conduit for flow around the piston assembly from the ignitor inlet to the ignitor outlet.

17. The ignitor of claim 16 further comprising a supply of hypergolic fluid located within the cavity between the piston assembly and the outlet, wherein movement of the piston assembly from the first position to the discharged position expels at least some of the supply of hypergolic fluid out of the outlet.

* * * * *